3 Sheets—Sheet 1.

F. G. WHEELER.

Assignor to A. H. DAILEY.

STEAM GENERATOR FOR STREET CARS.

No. 11,212. Reissued Dec. 22, 1891.

Attest
Walter Donaldson
F. L. Middleton

Inventor
F. G. Wheeler
by Geo. Gear
Atty.

THE NORRIS PETERS CO., PHOTO-LITHO., WASHINGTON, D. C.

F. G. WHEELER.

Assignor to A. H. DAILEY.

STEAM GENERATOR FOR STREET CARS.

No. 11,212. Reissued Dec. 22, 1891.

Attest
Walter Donaldson
F. L. Middleton

Inventor
F. G. Wheeler
by Elis Spear
Atty.

THE NORRIS PETERS CO., PHOTO-LITHO., WASHINGTON, D. C.

F. G. WHEELER.

Assignor to A. H. DAILEY.

STEAM GENERATOR FOR STREET CARS.

No. 11,212. Reissued Dec. 22, 1891.

Attest
Walter Donaldson
F. L. Middleton

Inventor
F. G. Wheeler
by Ellis Spear
Atty.

THE NORRIS PETERS CO., PHOTO-LITHO., WASHINGTON, D. C.

UNITED STATES PATENT OFFICE.

FREDERICK G. WHEELER, OF NEW YORK, ASSIGNOR TO ABRAM H. DAILEY OF BROOKLYN, NEW YORK.

STEAM-GENERATOR FOR STREET-CARS.

SPECIFICATION forming part of Reissued Letters Patent No. 11,212, dated December 22, 1891.

Original No. 299,607, dated June 3, 1884. Application for reissue filed September 5, 1891. Serial No. 404,903.

*To all whom it may concern:*

Be it known that I, FREDERICK GRIDLEY WHEELER, of New York city, county of New York, and State of New York, have invented new and useful Improvements in Steam-Generators for Street-Car or other Locomotive-Engines; and I do hereby declare that the following is a full and exact description of the same, reference being had to the accompanying drawings, and to the letters of reference marked thereon.

This invention consists, mainly, first, in the combination of a fire-box for supplying the requisite heat to produce the steam or sustain that already produced with a water-chamber in contact with the fire-box and a system of water-tubes communicating therewith not in contact with the fire-box; second, in the combination of the fire-box and smoke-flue with a water-box of special construction, the smoke-flue being turned downward into the water-box under the car, the box catching and retaining the surplus products of combustion, and, third, in the combination, with a steam-jet pipe, of a smoke-flue and a water-box, all of which will be fully described hereinafter.

Figure 1:
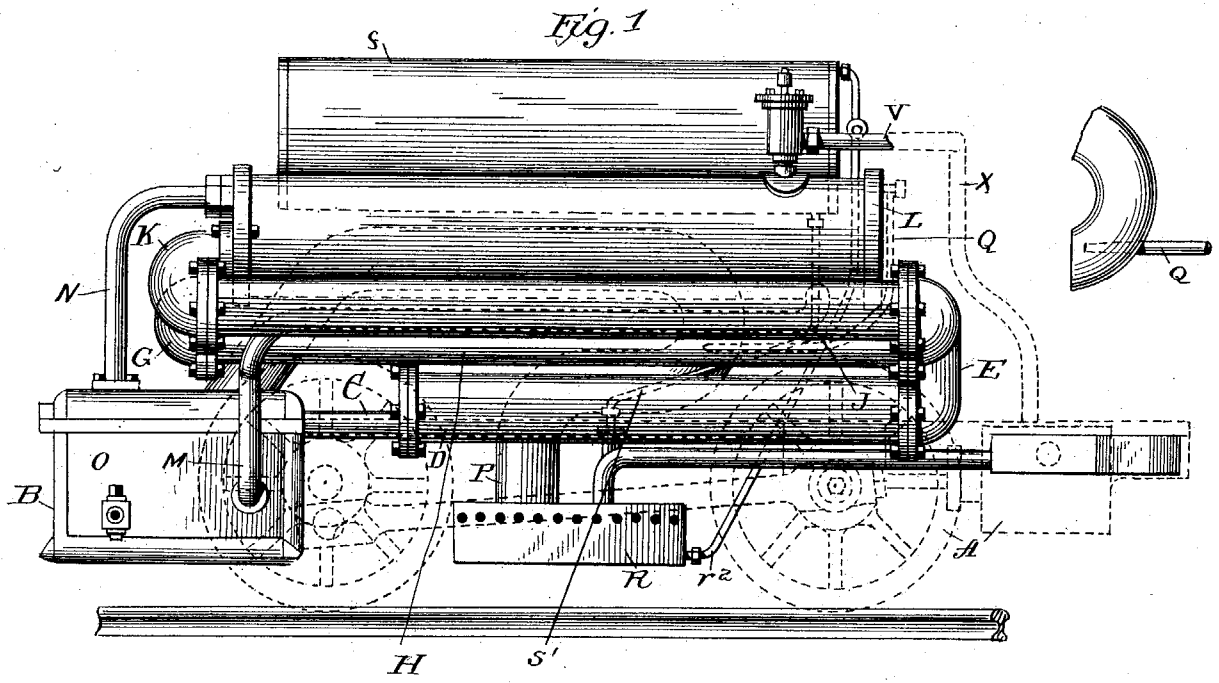
Figure 2:
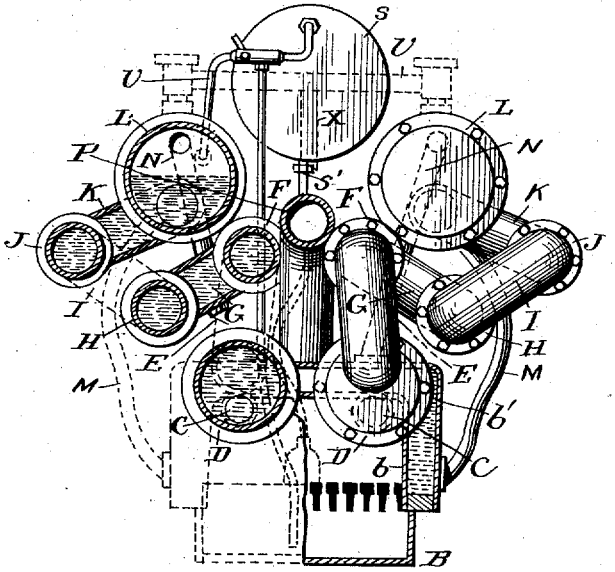
Figure 3:
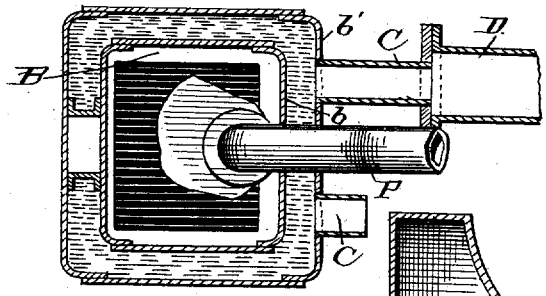
Figure 4:
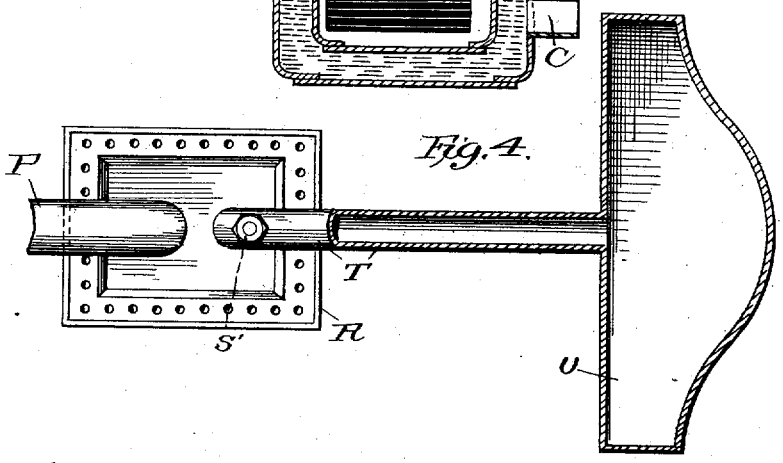
Figure 5:
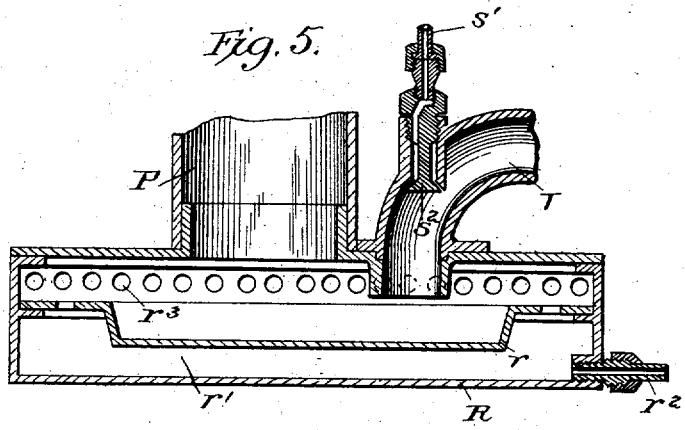
Figure 6:
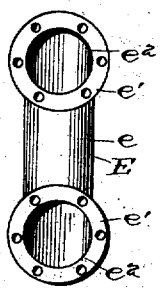

In the drawings, Figure 1 represents a side elevation of a street-car motor having my invention applied thereto, showing a side view of the tubes on one side; Fig. 2, an end view of the same, partially in section; Fig. 3, a plan view of the fire-box, partially in section, showing smoke-flue and tube connections; Fig. 4, a plan view of the water-box, exhaust-chamber, and the connection of the exhaust-chamber and water-flue with the water-box; Fig. 5, a longitudinal vertical section, on an enlarged scale, of the water-box and the parts immediately connected therewith. Fig. 6 is an end elevation of the hood or return-bend connecting the tubes.

To enable others skilled in the art to make my invention and properly use the same, I will proceed to describe fully its construction and manner of operation.

A represents an engine at one end of the motor, the actuating mechanism of which may be of any proper construction, this portion of the same forming no part of my invention.

B, Figs. 1, 2, and 3, represents a small fire-box located beneath the motor at the other end of the same, having an inner wall or shell *b* of copper or other metal, and an outer wall or shell *b'* of steel or iron, with intermediate water-chamber, as shown. These shells are provided with proper stays or bolts in a manner well understood. The water-chamber is in connection with a reservoir or storage-boiler adapted to contain water under pressure in circulation, the construction of which reservoir and connections I now proceed to describe.

C C, Figs. 1, 2, and 3, represent short pipes of comparatively small size leading from the front side of the water-chamber to the rear end of the large tubes D D, the two being united by a flanged connection of proper construction in a manner well understood.

E, Figs. 1, 2, and 6, represents hoods or return-bends, (fully illustrated in Fig. 6,) consisting of a casting having a central tube-like portion *e* and end portions *e' e'*, with openings $e^2$ $e^2$, adapted to receive and connect the ends of adjacent pipes by flanges, as shown. By means of these hoods the front ends of the tubes D D are united to the front ends of the tubes F F, as shown in Fig. 2, thus making a connecting extension in both series of tubes.

G G, Fig. 2, represent hoods or return-bends of similar construction at the opposite end, by means of which the rear ends of the tubes F F are united to the rear ends of the tubes H H.

I I, Fig. 2, represent hoods or return-bends of similar construction at the opposite end, by means of which the front ends of the tubes H H are united to the front ends of the tubes J J.

K K, Fig. 2, represent hoods or return-bends of similar construction at the opposite end, by means of which the rear ends of the tubes J J are united to the upper enlarged tubes or domes L L.

M M, Fig. 2, represent pipes leading from the lower sides of the domes L L at their forward ends back the sides of the water-chamber, as shown. By means of the pipes C C and M M the water-chamber is connected to each end of the tube system through the domes, this construction affording a perfect circulation when the water-volume contained therein is subjected to the action of heat.

N N, Figs. 1 and 2, represent auxiliary pipes leading from the upper side of the water-chamber into the upper side of the domes L L, as shown, by which the circulation of water through the domes is accelerated, because it more directly connects the domes with the water-chamber. A single fire-box and a single water-chamber is employed in connection with two systems of tubes, a system being located on each side of the engine, as shown, both systems being connected through the domes in which the steam is generated and forming a reservoir or boiler in which the water is held under heat or pressure.

O, Fig. 1, represents a cock by means of which both systems of tubes are supplied with water through the water-chamber.

P, Figs. 1, 3, 4, and 5, represents the smoke-flue consisting of a pipe of suitable length, which extends in a circuitous line from the fire-box to the water-box beneath the car, the discharge end of the same opening on the surface of the water, as shown in Fig. 5.

Q, Fig. 1, represents a small steam-pipe extending from one of the domes, the discharge end of which opens into the smoke-flue at any suitable point in its length. By means of this construction a jet of steam may be thrown into the chimney, and the steam being of lower temperature than the products of combustion the latter will be cooled, carried forward into contact with the water-box, and there further cooled.

R, Figs. 1 and 5, represents the water-box before referred to, into which discharge the smoke-flue and the exhaust-steam pipe, as shown.

S, Figs. 1 and 2, represents a water-tank above the system of hot-water pipes and disconnected therewith and containing cold water to supply the condensing system.

$s'$ represents a pipe by which water taken from the tank S is discharged through the spraying device into the water-box beneath the car. The spraying device, it will be observed, is provided with a cone $s^2$, Fig. 5, for dividing the water-stream and discharging it equally on all sides.

$r$ represents a basin for receiving the water from the spraying device $s^2$, which device itself receives water through the pipe $s'$ from the tank S, located at the top of the engine, as shown in Figs. 1 and 2. The interior basin $r$ is provided on the outer edge or flange with apertures, through which the overflow water escapes and passes down into the bottom of the water-box, whence it is returned through the ejector- pipe to the tank S. By this construction the basin $r$ will be kept full of water, while the water below it may be returned to the tank.

$r'$, Fig. 5, represents a chamber adapted to receive the overflow-water from the basin through proper openings in the flange, as shown in Fig. 4.

$r^2$, Fig. 5, represents an injector-pipe, by means of which the water in the chamber $r$ is returned to the tank S.

$r^3$ represents one of a series of openings through the water-box near its top, which openings are adapted to furnish the necessary draft and permit the escape of any excess of water which may accumulate.

T, Fig. 5, represents the discharge end of the exhaust-pipe, to which is attached a spraying device in such manner as to deliver the water upon the steam, and thus obtain the desired condensation.

U, Fig. 4, represents an enlarged chamber communicating with pipe T, into which the exhaust-steam is delivered from the cylinders, by which its force is weakened.

V V, Figs. 1 and 2, represent pipes leading from the top of the domes into a central pipe X, from which the supply of steam for the cylinders is drawn in any proper manner.

The operation of my invention is substantially as follows: The water-chamber and tube system having been supplied with water, either cold or hot, through the cock O until the domes L L are half-full of water, and the fire-box having been supplied with fuel, the following operation will result under the action of heat: The water in the water-chamber will be caused to pass through the various pipes and hoods to the domes and then back again to the chamber, a continuous circulation of heated water thus being maintained. The steam generated under the action of the heat will accumulate in the domes and be drawn off as needed through the central connecting-pipe X to the cylinders on each side of the car. As the water is diminished in volume the pressure of the steam is increased. This results from the increase in the area of the evaporating-surface and the elevation of the temperature of the water. The surplus products of combustion from the fire-box are carried downward through the smoke-flue into the water-box beneath the engine and discharged upon its surface. By means of this action a large portion of the smoke and gases is caught and retained. The draft is increased at any time, if desired, by the proper use of the blow-pipe in the smoke-flue.

The purpose of this invention is to supply a means of propelling street or other cars without the use of animal power, and is especially adapted for carrying practically into effect the process of supplying motive heat to railroad-cars described in the patent of E. H. Angamar, November 27, 1877, No. 197,584, in which water raised to a boiling-point in a stationary boiler is supplied to the water-chamber in the motor-car; but it may be employed, if desired, without using this process.

Some of the advantages of the described construction are as follows: By the employment of a system of tubes in the manner described the heat of the water volume is more perfectly maintained and the circulation more easily effected than when small tubes are employed. By locating the main portion of the circulating system out of contact with the fire-box the portion in contact therewith is kept covered with water, and the steam-generator or space where the water assumes the form of vapor or steam, being kept entirely distinct from the fire-box, renders it impossible for the steam to come in contact with the heated surface or for explosive conditions to occur. By discharging the surplus products of combustion and the exhaust-steam through a condensing medium into a water-box beneath the car the objection of escaping smoke or steam is avoided.

Having thus fully described my invention, what I claim as new, and desire to secure by Letters Patent, is—

1. In a motor, and in combination, a reservoir composed of a system of connected tubes adapted to contain heated water under pressure, a fire-box mounted upon said motor, a water-chamber in contact with the fire-box and having connections with the reservoir, whereby circulation is maintained, a steam-dome, an engine, and pipes connecting said steam-dome with the engine, all substantially as described.

2. In a motor, and in combination, a reservoir composed of a system of connected tubes adapted to contain heated water under pressure, a fire-box mounted upon said motor, a water-chamber in contact with the fire-box and having connections with the reservoir, whereby circulation is maintained, a steam-dome, an engine and connections between the steam-dome and engine, a condenser connected with the exhaust, and means for receiving the smoke, all substantially as described.

3. In combination with the water-chamber surrounding the fire-box, the circulating system of pipes and tubes, and the auxiliary pipes M M and N N, as described.

4. The water-box having the basin, the chamber, and the injector-pipe, as described.

5. A steam street-car or locomotive containing the following elements working in combination, substantially as herein described, namely: a fire-box and surrounding water-chamber, a tube system connected with water-chamber, an engine taking steam from tube system, a water-box communicating with the chimney of the fire-box, a steam-jet in the chimney to eject and cool the products of combustion and regulate chimney-draft, a water tank and spray to condense the exhaust-steam, an ejector-pipe to return the water of the water-box to the tank, all as set forth.

6. In a steam street-car or locomotive, the water-box R, constructed with an interior water-basin $r$, the flanges of which have openings to allow the descent of the surplus water into the bottom of the box R, substantially as herein shown and described.

7. In combination with the fire-box and smoke-flue, a closed water-box having perforations, as described, the products of combustion being discharged into said box upon the top of the water, as and for the purpose described.

8. In combination with a water-chamber in contact with the fire-box and a system of water-tubes not in contact with the fire-box, a cock O for receiving a heated water-supply from a stationary boiler, as described.

9. In combination with the steam-jet pipe Q, the flue P, and the water-box R, having the series of openings $r^3$, as described.

10. In combination with a steam-dome, a pipe for supplying a locomotive or street-car engine therefrom, a series of directly-connected water-tubes remote from the source of heat and in connection with the steam-dome, forming a storage and circulating system for water heated before entering the tubes to a degree which shall evolve steam.

This specification signed and witnessed this 12th day of August, 1891.

FREDERICK G. WHEELER.

Witnesses:

WILLIAM N. JOHNSON,
CHARLES F. THOMAS.